United States Patent
Kamiya

(10) Patent No.: US 9,925,666 B2
(45) Date of Patent: Mar. 27, 2018

(54) OPERATION SYSTEM OF ROBOT ARM

(71) Applicant: DENSO WAVE INCORPORATED, Chita-gun, Aichi-Pref. (JP)

(72) Inventor: Koji Kamiya, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 56 days.

(21) Appl. No.: 15/179,419

(22) Filed: Jun. 10, 2016

(65) Prior Publication Data
US 2017/0001301 A1  Jan. 5, 2017

(30) Foreign Application Priority Data
Jun. 30, 2015 (JP) ................. 2015-131119

(51) Int. Cl.
| B25J 3/04 | (2006.01) |
| B25J 9/16 | (2006.01) |
| B25J 13/02 | (2006.01) |
| B25J 21/00 | (2006.01) |

(52) U.S. Cl.
CPC ........... *B25J 9/1633* (2013.01); *B25J 3/04* (2013.01); *B25J 9/1676* (2013.01); *B25J 13/025* (2013.01); *B25J 21/00* (2013.01)

(58) Field of Classification Search
None
See application file for complete search history.

(56) References Cited

U.S. PATENT DOCUMENTS

| 6,394,731 B1* | 5/2002 | Konosu | B25J 5/04 414/5 |
| 9,314,922 B2* | 4/2016 | Dockter | B25J 3/04 |
| 2007/0142968 A1* | 6/2007 | Prisco | A61B 1/00193 700/245 |
| 2008/0307630 A1* | 12/2008 | Hasegawa | B21D 19/043 29/509 |
| 2012/0071752 A1* | 3/2012 | Sewell | A61B 6/12 600/424 |
| 2015/0224638 A1* | 8/2015 | Dockter | B25J 3/04 700/264 |
| 2015/0224639 A1* | 8/2015 | Dockter | B25J 3/04 700/264 |
| 2016/0008082 A1* | 1/2016 | Takagi | A61B 34/30 606/130 |

FOREIGN PATENT DOCUMENTS

| JP | H08-90461 A | 4/1996 |
| JP | H08-318479 A | 12/1996 |

* cited by examiner

*Primary Examiner* — Truc M Do
(74) *Attorney, Agent, or Firm* — Oliff PLC

(57) ABSTRACT

An operation system of a robot arm includes the robot arm disposed in a work box which is sealed, an operation apparatus disposed outside the work box and including an operation device which is operated by an operator to input an operation command of the robot arm, a control apparatus moving the robot arm based on the operation command from the operation apparatus, and a reaction force controller. Based on movable region information which indicates a movable region of the robot arm in the work box, as the robot arm approaches the limit of the movable region, the reaction force controller increases a reaction force which is against a force of moving the operation device by the operator in a direction approaching the limit of the movable region.

7 Claims, 6 Drawing Sheets

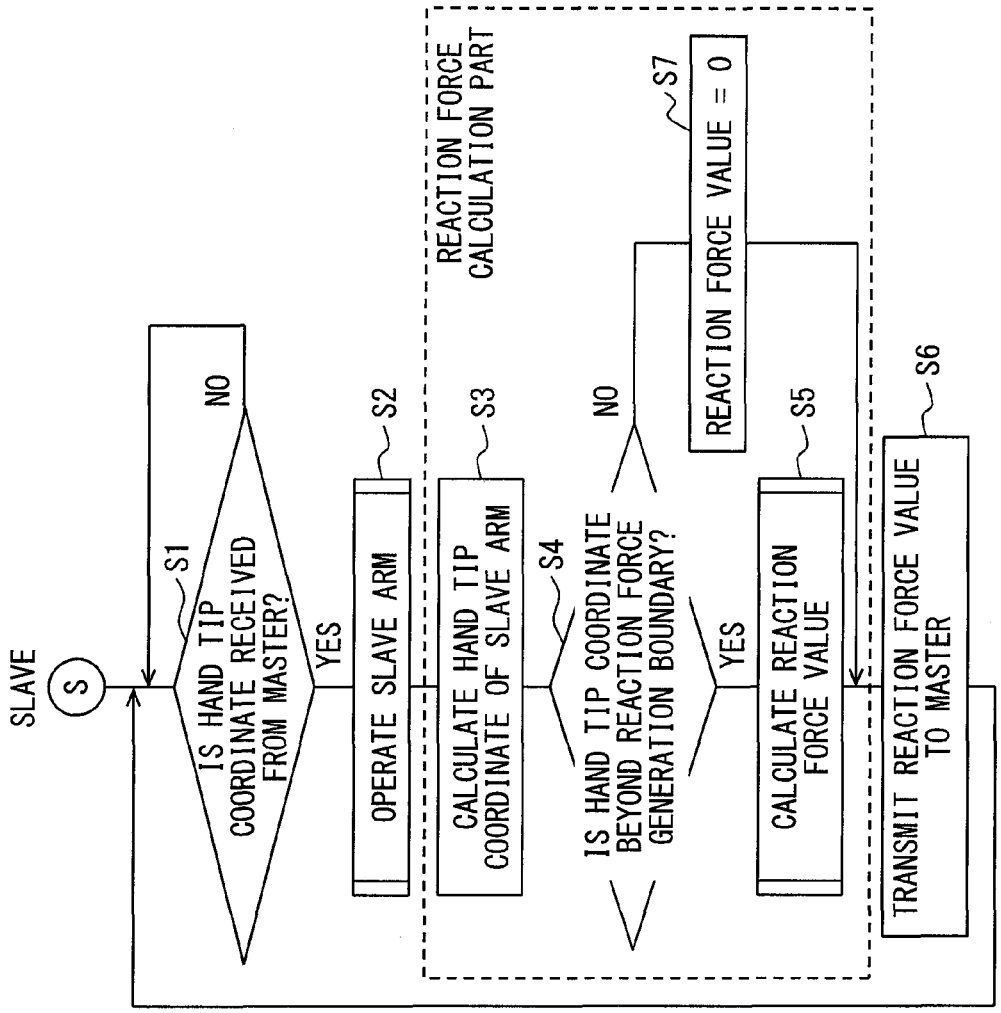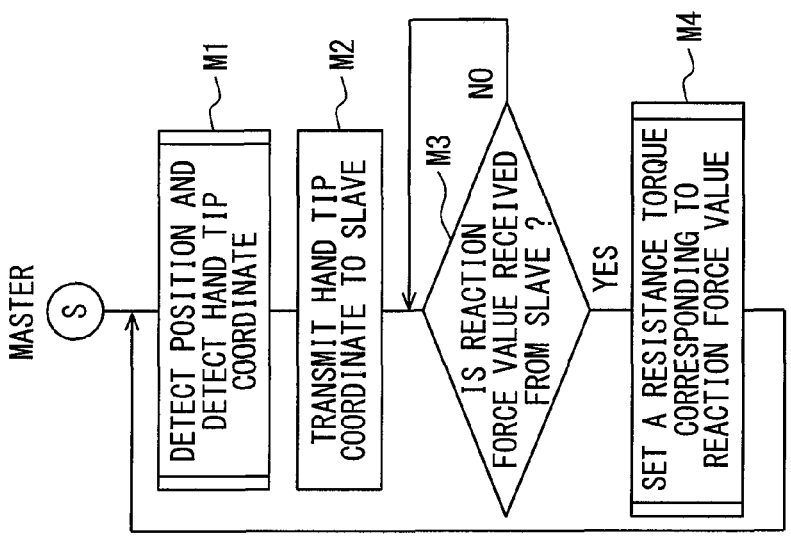

REACTION FORCE
VALUE

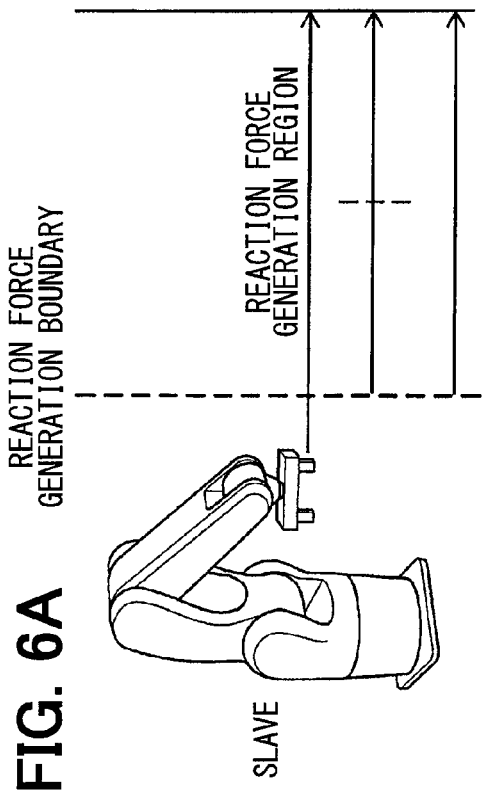
FIG. 6A
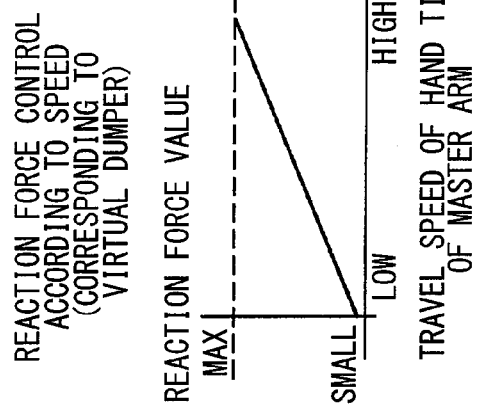
FIG. 6D
| DISTANCE | SPEED | REACTION FORCE VALUE |
|---|---|---|
| MIDDLE | MIDDLE | LARGE |
| FAR | LOW | SMALL |
| LIMIT | MIDDLE | LARGE |
| FAR | HIGHEST | LARGE |
| FAR | MIDDLE | MIDDLE |
| MIDDLE | LOW | MIDDLE |
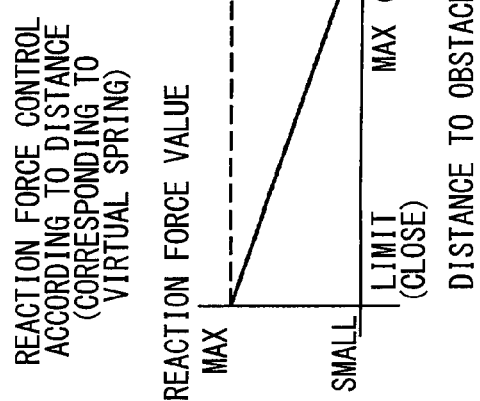
FIG. 6C
REACTION FORCE CONTROL ACCORDING TO SPEED (CORRESPONDING TO VIRTUAL DUMPER)
FIG. 6B
REACTION FORCE CONTROL ACCORDING TO DISTANCE (CORRESPONDING TO VIRTUAL SPRING)

OPERATION SYSTEM OF ROBOT ARM

CROSS REFERENCE TO RELATED APPLICATIONS

The present application is based on Japanese Patent Application No. 2015-131119 filed on Jun. 30, 2015, the disclosure of which is incorporated herein by reference.

TECHNICAL FIELD

The present disclosure relates to a system in which a robot arm disposed in a sealed work box is operated from outside the work box.

BACKGROUND

In recent years, robots are applied for works related to medicine or medical treatment. The robots used for the works related to medical treatment or the like need to have a sterilization resistance property and a sanitary property. Some robots with surface treatment so as to response to such demand have been put on the market.

In the works related to medical treatment or the like, for example, a cell culture performed in a sealed work box is supposed. In such a case, a work mode in which a robot arm is disposed in the work box, and an operator gives an operation command of the robot arm from outside the work box is necessary. Conventionally, a remote control system of a robot which is so-called master-slave type is applied to the work mode (for example, see JP 08-318479 A and JP 08-90461 A).

When the remote control system is applied, a side operating an operation apparatus outside the work box becomes a master, and the robot arm in the work box moves linked with the operation as a slave.

However, because an extremely high sealability is required for work box used for the works related to medical treatment or the like, and various apparatus and a work object other than the robot arm are also disposed in the work box, a movable region of the robot arm of an actual slave is extremely limited. Furthermore, when the master is operated, it is difficult for the operator to know how close the robot arm of the slave actually approaches an object due to the work box having the high sealability.

Furthermore, many medical staffs who operate the robot arm may have less operation experience of robots. Thus, if an operation device is operated unexpectedly, the robot arm may move beyond the movable region. Accordingly, for example, an inner wall of the work box or an apparatus inside the work box may be damaged, or the robot arm itself may be damaged.

SUMMARY

It is an object of the present disclosure to provide an operation system of a robot arm in which an operation of the robot arm disposed in a work box can be easily and safely performed from outside the work box even by an operator having less operation experience.

An operation system of a robot arm according to an aspect of the present disclosure includes the robot arm, an operation apparatus, a control apparatus, and a reaction force controller. The robot arm is disposed in a work box which is sealed and an inside of which is visible from outside. The operation apparatus is disposed outside the work box and includes an operation device which is operated by an operator to input an operation command of the robot arm. The control apparatus moves the robot arm based on the operation command from the operation apparatus. Based on movable region information which indicates a movable region of the robot arm in the work box, as the robot arm approaches a limit of the movable region, the reaction force controller increases a reaction force which is against a force of moving the operation device by the operator in a direction approaching the limit of the movable region.

According to the above-described configuration, as the robot arm approaches the limit of the movable region, when the operator moves the operation device in the direction approaching the limit, the operator receives a resistance by the reaction force which is gradually increased and an operation feeling becomes heavy. Thus, due to the resistance, the operator can sensuously recognize that the robot arm approaches the limit of the movable region before the robot arm reaches the limit, and the operator can spontaneously restrict an arm operation in the direction approaching the limit of the movable region. Thus, even when an operator having less operation experience of robots operates the robot arm in an extremely limited movable region in the work box an inside of which cannot be observed closely, a collision of the robot arm to an inner wall of the work box or other apparatus can be easily prevented.

BRIEF DESCRIPTION OF THE DRAWINGS

Additional objects and advantages of the present disclosure will be more readily apparent from the following detailed description when taken together with the accompanying drawings. In the drawings:

FIG. 3A is a flowchart showing a processing performed in the master;

FIG. 3B is a flowchart showing a processing performed in the slave;

FIG. 6A is a diagram explaining a relationship shown in FIG. 5;

FIG. 6B is a diagram showing an example of a reaction force control according to the distance to the obstacle;

FIG. 6C is a diagram showing an example of a reaction force control according to a travel speed of the hand tip of the slave arm;

FIG. 6D is a diagram showing an example of a relative image of a reaction force value generated according to the distance and the speed.

DETAILED DESCRIPTION

First Embodiment

Figure 1:
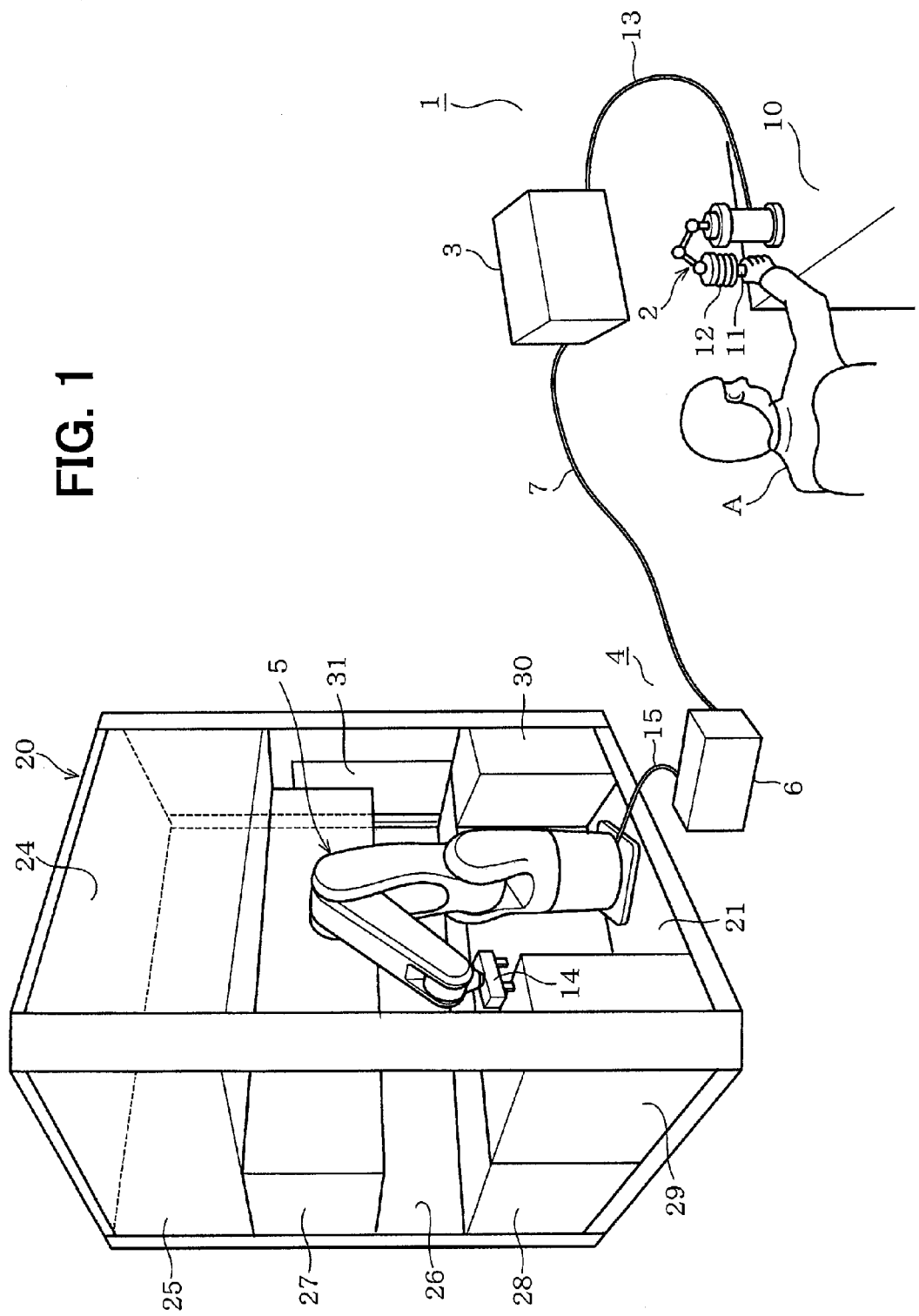
FIG. 1 is a diagram showing a whole configuration of a remote control system according to a first embodiment.

The following describes a first embodiment of the present disclosure. In FIG. 1 showing a schematic appearance of the whole configuration, a master 1 as an operation apparatus includes a master arm 2 as an operation device and a controller 3. A slave 4 as a working apparatus includes a slave arm 5 and a controller 6. The controller 6 corresponds to a control apparatus. The controllers 3, 6 are connected via a communication cable 7.

In the master 1, the master arm 2 is arranged on a console 10 and includes a grip 11 at an end portion. The grip 11 is rotatable by three joint mechanisms and is also rotatable in a direction around an axis of each joint mechanism. That is, the grip 11 is operatable with three degrees of translational freedom and three degrees of rotational freedom with respect to the console 10. Accordingly, the grip 11 can have a suitable position attitude by an operator A in a predetermined movable range.

The master arm 2 further includes a force detector 12 that detects a force received by the grip 11 when the operator A operates the grip 11. The force detector 12 detects the force received by the movement of the grip 11 as a force sense data of a translational force in x, y, z axis directions in an orthogonal coordinate system of the master arm 2 and a force sense data of a rotational force around each coordinate axis, and transmits the detected data to the controller 3 via a cable 13.

The master arm 2 is equipped with a drive mechanism including a motor as a driving section, which is not illustrated. The drive mechanism drives the grip 11 based on a control signal from the controller 3. The master arm 2 further includes a position detector (encoder) 16 that detects a rotational position of the motor that forms each driving mechanism.

The controller 3 performs arithmetic processing of the force sense data and transmits the processed data to the slave 4 via the communication cable 7. The controller 3 further transmits position information detected by the position detector 16. In addition, the controller 3 drives the master arm 2 based on the force sense data from the force detector 12 and a force data and a virtual reaction force data transmitted from the slave 4. The meaning of "the virtual reaction force" will be described below. Furthermore, the master arm 2 includes a switch for ordering a grip of a work object by a hand 14 of a slave arm 5. The switch may be provided at the grip 11 or separately from the grip 11.

In the slave 4, the slave arm 5 is disposed in a work box 20. The work box 20 is used for a medical work such as a cell culture, and an inside of the work box 20 is a sealed space. The slave arm 5 is connected with the controller 6 outside the work box 20 via a cable 15. A portion where the cable 15 enters the work box 20 from outside is sealed so as to prevent bacteria from leaking to both inside and outside.

The slave arm 5 is rotatably installed on a floor plate 21 of the work box 20 and includes the hand 14 at an end portion. The hand 14 is rotatable by three joint mechanisms and is also rotatable in a direction around an axis of each joint mechanism. Thus, the hand 14 is operatable with three degrees of translational freedom and three degrees of rotational freedom (vertical 6 axes structure). Accordingly, the hand 14 can have a suitable position attitude in a predetermined movable range. The hand 14 is formed so as to be grippable the work object and performs a grip action based on a control content from the master 1.

Figure 2:
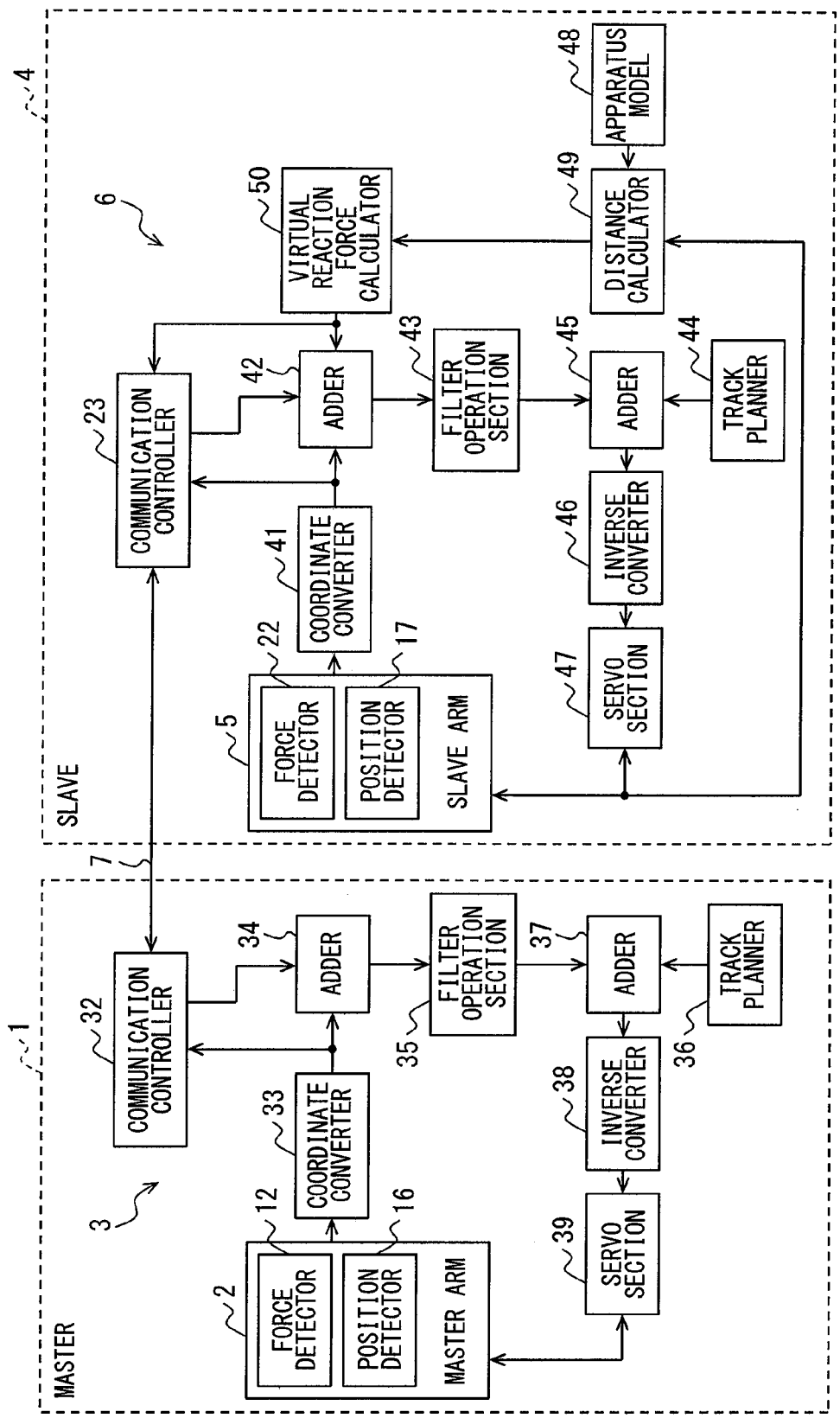
FIG. 2 is a functional block diagram showing a system configuration of a master and a slave according to the first embodiment.

The slave arm 5 is equipped with a force detector 22 that detects a received force when the hand 14 is driven (see FIG. 2). The force detector 22 detects the force received by the movement of the hand 14 as a force sense data of a translational force in x, y, z axis directions in an orthogonal coordinate system of the slave arm 5 and a force sense data of a rotational force around each coordinate axis, and transmits the detected data to the controller 6 via the cable 15.

The slave arm 5 is equipped with a drive mechanism including a motor as a driving section, which is not illustrated. The drive mechanism drives the hand 14 according to a control signal from the controller 6. The slave arm 5 further includes a position detector (encoder) 17 that detects a rotational position of the motor that forms each driving mechanism (see FIG. 2).

The controller 6 performs an arithmetic processing of the force sense data and transmits the processed data to the master 1 via a communication controller 23. The controller 6 further transmits position information detected by the position detector 16. In addition, the controller 6 drives the slave arm 5 based on the force sense data from the force detector 22 and the force sense data from the master 1.

The work box 20 has an approximately rectangular parallelepiped box shape. Inside the work box 20, objects 25-30 are disposed. The object 25 is disposed outside the slave arm 5 and is in contact with the whole lower surface of a ceiling 24 of the work box 20. The object 27 has a rectangular parallelepiped shape and is in contact with a part of a lower surface of the object 25 and an inner wall 26 of the work box 20. The object 28 has a rectangular parallelepiped shape and is disposed at a predetermined distance from the object 27 so as to be in contact with a part of the floor plate 21 and the inner wall 26. The objects 29, 30 are disposed on the floor plate 21 so as to sandwich the slave arm 5 therebetween.

For example, upper surfaces of the objects 28, 29 function as working tables above which the slave arm 5 works. At least a part of the objects includes a working instrument. A wall of the work box 20 with which the objects 28, 30 are in contact has a door 31 for taking in and out instruments. In a state where the door 31 is closed, the inside of the work box 20 is in a sealed state.

Because the inside layout of the work box 20 is designed as described above, a movable space (movable region) of the slave arm 5 is very limited. That is, except for a portion based on a structure of the slave arm 5, the slave arm 5 can work only in a space where the objects 27-30 do not exist below the object 25. In the work box 20, at least a front wall surface with which both the objects 29, 30 are in contact and a side wall surface on which both the objects 28, 29 are in contact are made of transparent glass or resin so that an operator A can operate the master arm 2 while viewing the movement of the slave arm 5 from outside the work box 20. That is, the inside of the work box 20 is visible from outside.

Next, the following describes block configurations in the controllers 3, 6 with reference to FIG. 2. The controller 3 in the master 1 includes a communication controller 32, a coordinate converter 33, an adder 34, a filter operation section 35, a track planner 36, an adder 37, an inverse converter 38, and a servo section 39. The communication controller 32 communicates with a communication controller 23 in the slave 4. The coordinate converter 33 converts the force sense data detected by the force detector 12 into a standard coordinate. The coordinate converter 33 is provided to establish consistency between the master 1 and the slave 4 even when a scale or a type of the slave 4 is different. In other words, the coordinate converter 33 makes it possible to flexibly cope with the difference of scale or type between the master arm 2 and the slave arm 5. The coordinate converter 33 transmits the converted force sense data to the communication controller 32 and the adder 34.

The adder 34 receives the converted force sense data via the coordinate converter 33 and receives the force sense data and the virtual reaction force data transmitted from the slave 4 via the communication controller 32. Hereafter, the combination of the force sense data and the virtual reaction force data is referred to as "an applied force data". The adder 34 transmits a value obtained by adding the above-described data to the filter operation section 35. When a value of a new applied force data is different from a value of a currently outputting applied force data, the filter operation section 35 has a function of a low pass filter that transmits an applied force data corresponding to the difference while gradually changing the amount.

The track planner 36 generates a track data, that is, a position data according to lapsed time when the master arm 2 is operated based on a control program. The inverse converter 38 receives an additional value of the track data and the position data corresponding to the applied force data as a target position data via the adder 37. The inverse converter 38 inversely converts the target position data into a joint angle target data actually corresponding to the master arm 2 and transmits the joint angle target data to the servo section 39.

The servo section 39 drives the grip 11 in the master arm 2. When the applied force data includes the virtual reaction force data, the servo section 39 generates a reaction force (counter torque, resistance torque) opposite to an operation direction of the grip 11 based on the virtual reaction force data. The communication controller 32 includes a memory and stores the force sense data transmitted from the coordinate converter 33 and the applied force data transmitted from the communication controller 23 in each predetermined address in the memory.

The controller 6 in the slave 4 includes a coordinate converter 41, an adder 42, a filter operation section 43, a track planner 44, an adder 45, an inverse converter 46, a servo section 47, an apparatus model 48, a distance calculator 49, and a virtual reaction force calculator 50. The coordinate converter 41 converts the force sense data detected by the force detector 22 in the slave arm 5 into a standard coordinate and works in a manner similar to the coordinate converter 33 in the master arm 2. The coordinate converter 41 transmits the converted force sense data to the communication controller 23. The adder 42 receives the converted force sense data from the coordinate converter 41 and receives the force sense data transmitted from the master 1 via the communication controller 32.

The apparatus model 48 stores three-dimensional coordinate information indicating the movable region of the slave arm 5, which is determined based on the layout of the objects 25, 27-30 in the work box 20. When the slave arm 5 is operated, a situation that the slave arm 5 comes in contact with or collides with the inner wall or the objects 25, 27-30 in the work box 20 should be prevented. Thus, the apparatus model 48 sets a limit position of the movable region with a predetermined margin so that the slave arm 5 does not come in contact with the inner wall or the objects 25, 27-30.

The distance calculator 49 calculates a distance between a current position of the slave arm 5 transmitted from the position detector 17 and the limit position of the movable region of the slave arm 5 transmitted from the apparatus model 48 and transmits the distance to the virtual reaction force calculator 50. The virtual reaction force calculator 50 calculates the virtual reaction forces applied to the slave arm 5 and the master arm 2 based on the transmitted distance and a travel speed of a hand tip of the slave arm 5, and transmits the virtual reaction force data to the communication controller 23 and the adder 42. The virtual reaction force calculator 50 acquires the travel speed from a position change amount detected by the position detector 17. The virtual reaction force calculator 50 corresponds to a reaction force controller.

The adder 42 receives the force sense data and the virtual reaction force data and transmits a value obtained by adding the force sense data and the virtual reaction force data to the filter operation section 43. The filter operation section 43 works in a manner similar to the filter operation section 35 in the master 1. The track planner 44 works in a manner similar to the track planner 36 in the master 1. The adder 45 and the inverse converter 46 respectively work in a manner similar to the adder 37 and the inverse converter 38 in the master 1.

The servo section 47 drives the hand 14 of the slave arm 5. The communication controller 23 includes a memory and stores the force sense data transmitted from the coordinate converter 41 and the communication controller 32 and the virtual reaction force data transmitted from the virtual reaction force calculator 50 in each predetermined address in the memory.

Next, the following describes an operation of the present embodiment. The principle of drive control based on transfer of the force sense data is similar to JP 08-318479 A. Basically, the slave arm 5 moves linked with the movement of the master arm 2 that is gripped and operated by the operator A by hand. In the present embodiment, when the slave arm 5 moves in the slave 4, the virtual reaction force data is generated by the operations of the apparatus model 48, the distance calculator 49, and the virtual reaction force calculator 50. Then, the virtual reaction force data is transmitted to the master 1 and affects an operation feeling of the master arm 2 by the operator A.

As shown in FIG. 3A, when the operator A operates the master arm 2, each axis position of the master arm 2 is detected and a hand tip coordinate is calculated (M1). Then, information of the hand tip coordinate is transmitted to the slave 4 (M2). As shown in FIG. 3B, in the slave 4, when the hand tip coordinate transmitted from the master 1 is received (S1; YES), the controller 6 moves the hand tip (the hand 14) of the slave arm 5 to a position corresponding to the received hand tip coordinate (S2).

The controller 6 calculates the hand tip coordinate of the slave arm 5 during operation (S3), and determines whether the hand tip coordinate is beyond a reaction force generation boundary that is set in the movable region of the slave arm 5 (S4). The reaction force generation boundary is a three-dimensional boundary set in the vicinity of the limit of the movable region with the predetermined margin. A region between the reaction force generation boundary and the limit of the movable region is a reaction force generation region. When the hand tip coordinate is not beyond the reaction force generation boundary, that is, when the hand tip coordinate is within the reaction force generation boundary (S4; NO), a reaction force value is 0 (S7).

On the other hand, when the hand tip coordinate is beyond the reaction force generation boundary (S4; YES), the virtual reaction force calculator 50 calculates the reaction force value based on the distance between the hand tip position and the limit of the movable region (S5), the virtual reaction force calculator 50 transmits the calculated reaction force value to the master 1 (S6). When the master 1 receives the reaction force value (M3; YES), the servo section 39 in the controller 3 generates the resistance toque at the motor of the corresponding axis so as to apply the reaction force in a direction opposite to a direction in which the operator A operates the master arm 2 at that point.

Figure 4:
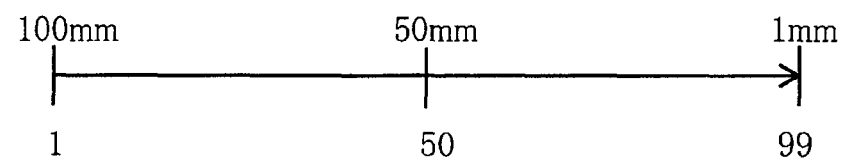
FIG. 4 is a diagram showing an example of a relative value of a reaction force generated according to a distance from a hand tip of a slave arm to an obstacle.

For example, as shown in FIG. 4, when a distance between the hand tip position of the slave arm 5 and the limit of the movable region, that is, a distance from the hand tip of the slave arm 5 to an obstacle such as the objects 25, 27-30 in the work box 20 decreases from 100 mm to 50 mm to 1 mm, a relative value of the reaction force is gradually increased from 1 to 50 to 99. The reaction force value corresponds to a weight of the motor and is a torque amount that cancels the force of the operator A. At least the reaction force of 99 is set to a force at which it is substantially impossible for the operator A to operate the master arm 2 against the reaction force. When the distance is 0 mm, "a soft limiting" in which the controller 3 limits the operation by a separate control program works, and the master arm 2 completely stops moving.

Figure 5:
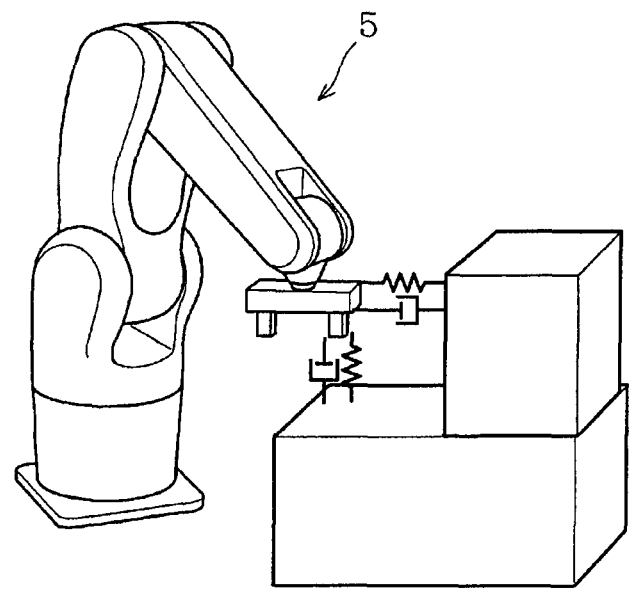
FIG. 5 is a diagram showing a virtual reaction force model of the slave arm.

FIG. 5 is a virtual reaction force generation model of the slave arm 5, and the hand tip of the slave arm 5 and the obstacles (the objects 25, 27-30) are connected via virtual springs and virtual dampers. As shown in FIG. 6A, when the hand tip of the slave arm 5 is not beyond the reaction force generation boundary, the reaction force value is 0, and the operator A can operate the master arm 2 according to an applied operating force without receiving a particular resistance.

When the hand tip of the slave arm 5 is beyond the reaction force generation boundary, the reaction force is generated in the drive mechanism of the master arm 2, and the operator A receives a resistance in the operation feeling of the master arm 2. At the time, a reaction force control according to the distance to the obstacle as the limit of the movable region (corresponding to the virtual springs), and a reaction force control according to the travel speed of the hand tip of the master arm 2 (corresponding to the virtual dumpers) are performed in parallel.

In the reaction force control according to the distance, as shown in FIG. 6B, the reaction force value is increased with a decrease in the distance to the limit of the movable region. In FIG. 6B, the reaction force value is illustrated as being changed linearly as an example. Alternatively, the reaction force value may be changed in a manner of a secondary curve. In the reaction force control according to the speed, as shown in FIG. 6C, the reaction force value is increased with an increase in the travel speed of the hand tip of the master arm 2. Also in FIG. 6C, the reaction force value is illustrated as being changed linearly as an example. Alternatively, the reaction force value may be changed in a manner of a secondary curve.

The reaction force value applied to the master arm 2 is the sum of the reaction force value applied according to the distance and the reaction force value applied according to the travel speed. FIG. 6D shows an example of a relative image of the reaction force value generated according to the distance and the travel speed.

In a pattern shown in FIG. 6A to FIG. 6D, parameters are set in such a manner that the reaction force value becomes the maximum just before the distance reaches the limit of the movable region or when the travel speed in the reaction force generation region becomes the highest. Accordingly, the applied reaction force tends to be large, and a collision of the slave arm 5 can be certainly prevented. In addition, the reaction force value can be set in a region smaller than the reaction force generation region. Depending on an individual design, the reaction force value may be set in such a manner that the reaction force value becomes the maximum just before the distance reaches the limit of the movable region and when the travel speed in the reaction force generation region becomes the highest. In the above-described case, the applied reaction force value generally tends to be small, an influence on the operation feeling of the operator A is small, and the operator A can feel the master arm 2 easily moving. However, it is necessary to set a larger reaction force generation region.

In the above-described example, the reaction force is generated when the hand tip of the slave arm 5 is beyond the reaction force generation boundary. However, without limiting to the hand tip, the reaction force is generated when any part of the slave arm 5 is beyond the reaction force generation boundary. At the reaction force generation boundary near the region in which the hand 14 of the slave arm 5 works, the reaction force value is set so as not to affect the work.

According to the present embodiment, the slave arm 5 is disposed in the work box 20 which is sealed, and the master arm 2 as the operation apparatus for inputting the operation command of the slave arm 5 by the operator A is disposed outside the work box 20. Based on the movable region information that indicates the movable region of the slave arm 5 in the work box 20, as the slave arm 5 approaches the limit of the movable region, the virtual reaction force calculator 50 increases the reaction force which is against the force of moving the master arm 2 by the operator A in the direction approaching the limit of the movable region.

Accordingly, as the slave arm 5 approaches the limit of the movable region, when the operator A continues to move the master arm 2 in the same direction, the operator A receives the resistance that is gradually increased, and the operation feeling becomes heavy. Thus, due to the resistance, the operator A can sensuously recognize that the slave arm 5 approaches the limit of the movable region and can spontaneously restrict the arm operation in the direction approaching the limit. Therefore, even when an operator with less operation experience of robots operates the slave arm 5 in the work box 20 within the very limited movable region, a collision of the slave arm 5 against the inner wall of the work box 20 or the objects 25, 27-30 can be easily restricted.

The operation device in the operation apparatus is the master arm 2 having the axial structure same as the slave arm 5. Accordingly, even an operator with less operation experience of robots can give an operation command by operating the master arm 2 having a similar appearance as the slave arm 5, while intuitively grasping the movement of the slave arm 5 in the work box 20 by the reaction force received at the master arm 2.

Furthermore, the virtual reaction force calculator 50 sets the reaction force generation boundary before reaching (i.e., in front of) the limit of the movable region. The virtual reaction force calculator 50 does not generate the reaction force when the slave arm 5 is within the reaction force generation boundary and generates the reaction force when the slave arm 5 is beyond the reaction force generation boundary. Accordingly, because the reaction force is suddenly generated when the slave arm 5 moves beyond the reaction force generation boundary, the operator A receives an uncomfortable feeling in operation. Then, due to the uncomfortable feeling, the operator A can easily recognize that the slave arm 5 approaches the limit of the movable region.

In addition, because the virtual reaction force calculator 50 increases the reaction force with the increase in the travel speed of the hand tip when the slave arm 5 moves beyond the reaction force generation boundary, the virtual reaction force calculator 50 can control the intensity of the reaction force according to both parameters of the distance and the travel speed.

The virtual reaction force calculator 50 is disposed in the controller 6 of the slave 4, an increase command of the reaction force is transmitted to the master 1 as the slave arm 5 approaches the limit of the movable region, and the controller 3 of the master 1 increases the reaction force applied to the master arm 2 based on the received increase command. That is, the controller 6 of the slave 4 needs to limit so that the movement of the slave arm 5 is not beyond the movable region regardless of the operation command from the master 1. Therefore, it is appropriate that the controller 6 holds and manages the information about the movable region, and according to the above-described configuration, the controller 3 does not need to perform a complicated calculation process.

Second Embodiment

Components of the second embodiment which are substantially the same as the corresponding components of the first embodiment are denoted by the same reference numerals, and a description about the components may be omitted. Components of the second embodiment different from the first embodiment will be mainly described.

Figure 7:
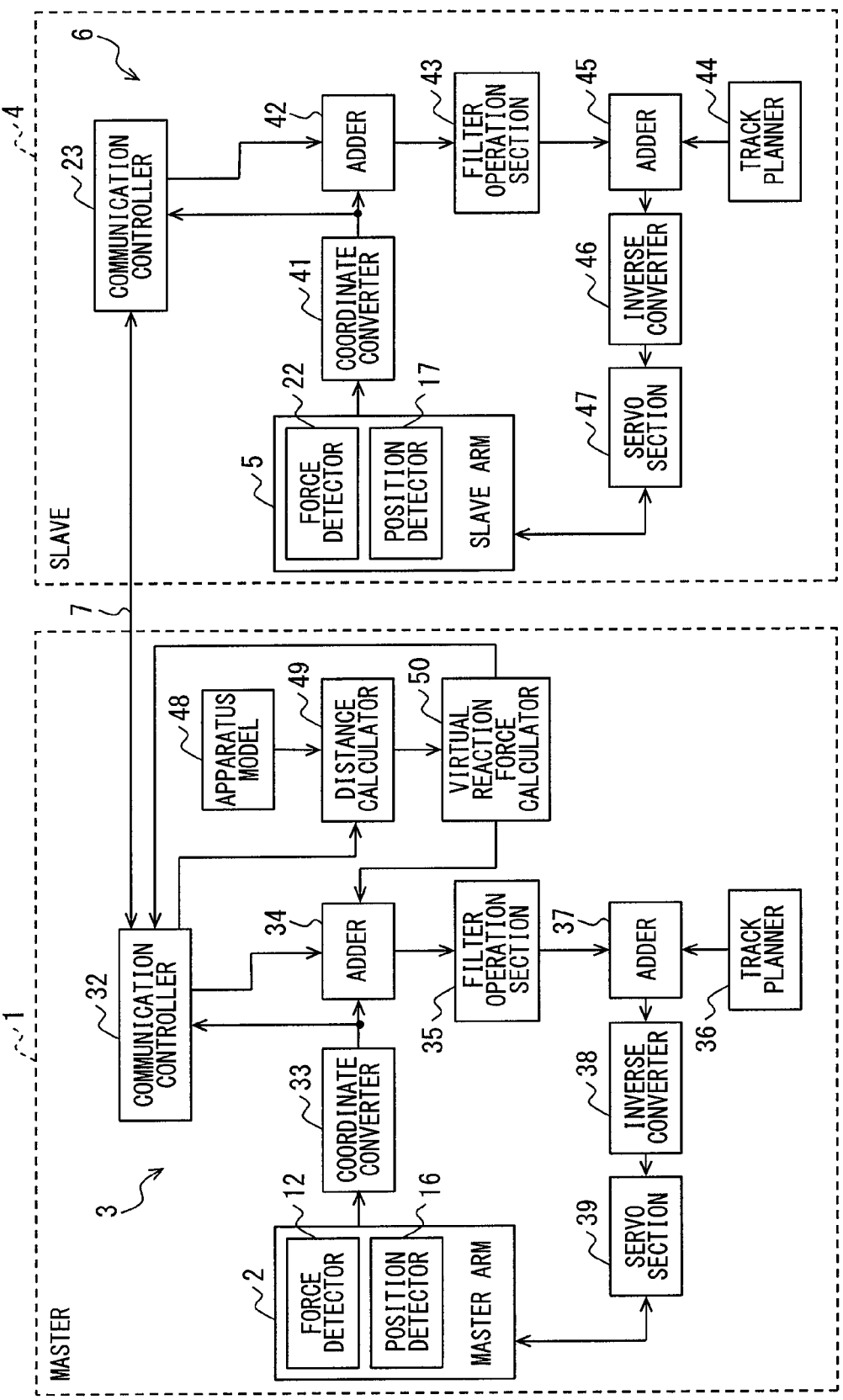
FIG. 7 is a functional block diagram showing a system configuration of a master and a slave according to a second embodiment.

As shown in FIG. 7, the apparatus model 48, the distance calculator 49, and the virtual reaction force calculator 50, which are disposed in the controller 6 of the slave 4 in the first embodiment, are disposed in the controller 3 of the master 1 in the second embodiment. In the present case, the virtual reaction force data transmitted from the virtual reaction force calculator 50 is input to the adder 34. Also in the second embodiment having the above-described configuration, similar effects as the first embodiment can be obtained. In addition, a communication data amount from the slave 4 to the master 1 can be reduced.

The present disclosure is not limited only to the embodiments described above or described in the drawings, and the following modification or expansion are possible. Works performed in the work box 20 are not limited to the work related to medical treatment and may be any work that is appropriate for being performed in a sealed space. An imaging device such as a camera may be disposed on the slave arm 5, the inside of the work box 20 may be scanned three-dimensionally to generate information about the movable region according to the inside layout, and the information may be initially set to the apparatus model 48. The operation device in the operation apparatus does not always need to have the axial structure same as the robot arm. For example, the operation apparatus may be a teaching pendant.

What is claimed is:

1. An operation system of a robot arm comprising:
   the robot arm disposed in a work box which is sealed and an inside of which is visible from outside;
   an operation apparatus disposed outside the work box and including an operation device which is operated by an operator to input an operation command of the robot arm;
   a control apparatus moving the robot arm based on the operation command from the operation apparatus; and
   a reaction force controller, wherein
   based on movable region information which indicates a movable region of the robot arm in the work box, as the robot arm approaches a limit of the movable region, the reaction force controller increases a reaction force which is against a force of moving the operation device by the operator in a direction approaching the limit of the movable region.

2. The operation system of the robot arm according to claim 1, wherein
   the operation device of the operation apparatus has an axial structure same as the robot arm.

3. The operation system of the robot arm according to claim 1, wherein
   the reaction force controller sets a reaction force generation boundary before reaching the limit of the movable region, and
   the reaction force controller does not generate the reaction force when the robot arm is within the reaction force generation boundary and generates the reaction force when the robot arm is beyond the reaction force generation boundary.

4. The operation system of the robot arm according to claim 3, wherein
   the reaction force controller increases the reaction force with an increase in a travel speed of the robot arm when the robot arm moves beyond the reaction force generation boundary.

5. The operation system of the robot arm according to claim 1, wherein
   the reaction force controller is disposed in the control apparatus,
   the reaction force controller transmits an increase command of the reaction force to the operation apparatus as the robot arm approaches the limit of the movable region, and
   the operation apparatus increases the reaction force based on the increase command.

6. The operation system of the robot arm according to claim 1, further comprising:
   an apparatus model that is determined in accordance with a layout of objects placed in the work box, and stores the movable region information on the movable region of the robot arm.

7. The operation system of the robot arm according to claim 1, wherein
   the reaction force occurring in the operation device is a sum of a reaction force applied in accordance with a distance from a limit of the movable region and a reaction force applied in accordance with a travel speed of the operation device.

* * * * *